United States Patent [19]

Radici et al.

[11] 4,355,153
[45] Oct. 19, 1982

[54] PROCESS FOR THE POLYMERIZATION OF FORMALDEHYDE

[75] Inventors: Pierino Radici, Turate; Paolo Colombo, Saronno, both of Italy

[73] Assignee: Societa' Italiana Resine S.I.R. S.p.A., Milan, Italy

[21] Appl. No.: 208,457

[22] Filed: Nov. 19, 1980

[51] Int. Cl.$^3$ .................................................. C08L 77/02
[52] U.S. Cl. ........................................ 528/243; 528/270
[58] Field of Search ................................ 528/243, 270

[56] References Cited

U.S. PATENT DOCUMENTS

| | | | |
|---|---|---|---|
| 2,734,889 | 2/1956 | Starr ................................. | 528/270 |
| 2,844,561 | 7/1958 | Bechtold et al. .................. | 525/154 |
| 2,848,437 | 8/1958 | Langsdorf et al. ................ | 528/270 |
| 2,966,476 | 12/1960 | Kralovec et al. .................. | 528/230 |
| 2,993,025 | 7/1961 | Alsup et al. ....................... | 525/400 |
| 2,994,687 | 8/1961 | Goodman et al. ................. | 528/270 |
| 3,027,352 | 3/1962 | Walling et al. .................... | 528/241 |
| 3,458,479 | 7/1969 | Lugo et al. ........................ | 526/68 |
| 3,875,117 | 4/1975 | Ackermann et al. .............. | 525/400 |
| 3,979,480 | 9/1976 | Radici et al. ...................... | 528/243 |
| 4,000,215 | 12/1976 | Radici et al. ...................... | 528/243 |

FOREIGN PATENT DOCUMENTS

| | | | |
|---|---|---|---|
| 221353 | 10/1957 | Australia ........................... | 528/243 |
| 708225 | 4/1965 | Canada ............................. | 528/243 |

*Primary Examiner*—Ronald W. Griffin
*Attorney, Agent, or Firm*—Sughrue, Mion, Zinn, Macpeak & Seas

[57] ABSTRACT

Polyformaldehyde is prepared by polymerizing anhydrous monomeric formaldehyde in an organic, liquid and inert diluent which is a non-solvent for polyformaldehyde, in the presence of a catalyst of the formula:

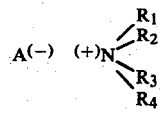

wherein $A^{(-)}$ is a lactamate group:

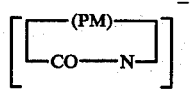

in which PM is a linear polymethylene chain with from 3 to 13 carbon atoms, possibly substituted with one or more alkyl, cycloalkyl, aryl or alkylaryl radicals, and wherein $R_1$, $R_2$, $R_3$ and $R_4$ independently are an alkyl, cycloalkyl, aryl or alkylaryl radical.

7 Claims, No Drawings

PROCESS FOR THE POLYMERIZATION OF FORMALDEHYDE

The present invention relates to the preparation of polyformaldehyde employing a new class of compounds capable of catalysing the polymerization of formaldehyde.

Formaldehyde polymers, or polyoxymethylenes, are known in the art with molecular weights greater than at least 10,000, having mechanical characteristics such as toughness, hardness, resilience, exceptional dimensional stability and dielectric properties such as to make them useful as plastic materials for technical uses.

These polyoxymethylenes are generally prepared by polymerizing anhydrous, monomeric formaldehyde in an organic liquid reaction medium, operating within a wide temperature range and in the presence of catalysts for the polymerization. The known catalysts suitable for this purpose are of various types, such as amino compounds, for example aliphatic, cycloaliphatic and aromatic amines, or arsines, stibines and phosphines in which the hydrogen atoms bonded to the arsenic, antimony and phosphorus respectively are replaced by hydrocarbon organic radicals. Other catalysts used in the art are organometallic compounds, metal carbonyls, onium compounds and oxidizing-reducing agents. For this known art, reference can be made to U.S. Pat. Nos. 2,734,889, 2,828,286, 2,844,561, 2,848,437, 2,994,687 and 3,027,352.

The catalysts indicated above do not give completely satisfactory results, mainly because they frequently do not allow the molecular weight of the formaldehyde polymer to be controlled effectively. As a result the polyoxymethylenes produced may have a wide dispersion of molecular weights with relative disadvantages. A further disadvantage of numerous catalysts, even the most active, lies in the need to eliminate the catalytic residues from the polymer. The presence of these residues, especially in the case of metals, induces degradation reactions when the polyoxymethylenes are processed in the molten state. The degradation of the polymer manifests itself in a loss of polyformaldehyde, coloration and in a worsening of the physical and mechanical properties of the moulded articles in general. The side reactions initiated vary according to the type of metal; for example, the alkali or alkaline-earth metals readily induce the formation of coloured products as a result of aldehyde-crotonic type catalysis. Hence it is essential that these metallic residues be eliminated if the desired characteristics, especially those of colour, are to be maintained. Purification treatments which give the required degree of purity are, however, onerous because of the low solubility of the catalytic residues in the organic liquids and reagents used in the subsequent stages of stabilization of the polymer, such as esterification, etherification, etc.

In some cases, the catalytic residues induce degradation of the reagents used for the stabilization. Such a phenomenon occurs, for example, when alkali metal residues come into contact with acetic anhydride, under the conditions used for the esterification of the raw formaldehyde polymer.

The object of the present invention is to overcome the disadvantages of the known art by using new catalysts in the process for polymerizing formaldehyde.

Accordingly, the invention provides a process for preparing polyformaldehyde by polymerizing anhydrous monomeric formaldehyde in an organic diluent which is liquid under the reaction conditions, which is a non-solvent for the polyoxymethylene and which is inert (unreactive) towards the other constituents of the reaction medium, operating in the presence of catalytic quantities of a saline compound of the following general formula:

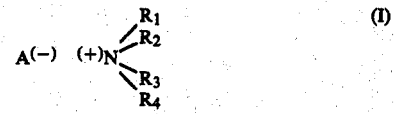

in which $A^{(-)}$ represents an anionic lactam group and $^{(+)}N(R_1R_2R_3R_4)$ represents a quaternary ammonium group.

More particularly, in the preceding general formula, $A^{(-)}$ is a lactamate group which can be represented by the general formula:

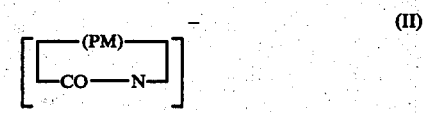

in which PM is a linear polymethylene chain with from 3 to 13 carbon atoms, non substituted or having one or more hydrogen atoms replaced by an alkyl, cycloalkyl, aryl or alkylaryl radical. Specific, non-limitative examples of $A^{(-)}$ radicals are α-pyrrolidonate, α-piperidonate, ε-caprolactamate, and ω-lauryllactamate.

Furthermore, in the general formula (I), $R_1$, $R_2$, $R_3$ and $R_4$ in the cationic group $^{(+)}N(R_1R_2R_3R_4)$ represent, independently, an alkyl, cycloalkyl, aryl or alkylaryl radical. Specific, non-limitative examples of these cationic groups are tetramethyl-, tetraethyl-, tetrapropyl-, tetrabutyl-, tetraheptyl-, phenyltrimethyl-, benzyltrimethyl-, and cyclohexyltrimethyl-ammonium.

The compounds of formula (I) are effective catalysts for the polymerization of anhydrous monomeric formaldehyde in apolar solvents, which allow high molecular weights of the polyoxymethylene to be achieved. More particularly, the advantages inherent in the use of the catalyst of the present invention are:

high catalytic activity which allows the polymerization to be carried out with a low content of free monomer in the reaction medium, giving a practically quantitative yield of the polymer with respect to the formaldehyde introduced;

the formation of polymers with limited molecular weight distributions, as expressed by the ratio $\overline{M}w/\overline{M}n$, where $\overline{M}w$ represents the weight-average molecular weight and $\overline{M}w$ represents the number-average molecular weight; as is known this physical and molecular characteristic of the polyoxymethylene is of fundamental importance to the properties of a polymeric material, above all with regard to the toughness, the resilience, the resistance to abrasion and the dimensional stability of the moulded articles;

the formaldehyde polymers obtained do not require purification or specific treatments to remove the catalytic residues present; in fact, during the stabilization of the terminal groups of the polyoxymethylene by, for example, esterification with acetic anhydride or etherification with orthoesters, these residues undergo thermal degradation whereby they are practically eliminated; the behaviour of these residues, under the conditions used for the stabilization treatment, is that typical of quaternary ammonium hydroxides which, at temperatures greater than 100° C., are converted into tertiary amines, alkenes and water;

the possibility of carrying out the reaction in a continuous polymerization system with a high weight ratio between polyoxymethylene and liquid diluent in the reaction medium, this ratio possibly reaching values of the order of 1:1;

the polyoxymethylenes obtained with the catalysts of the present invention have very high apparent densities (of the order of 0.5 to 0.7 g/ml), can easily be separated from the reaction medium by means of decanting or filtration and the filtered polymer has a very low residual diluent content.

The quaternary ammonium salts of the lactams may be prepared by the following general method. An anhydrous solution containing a known quantity of an alkali metal alcoholate (for example sodium methylate, potassium ethylate, etc.) is mixed with an anhydrous alcoholic solution containing an equivalent quantity of a quaternary ammonium halide (for example the chloride or bromide). The alkali metal halide thus formed separates from the solution, or is precipitated by the addition of a non-solvent liquid (for example ethyl ether). After filtration of the alkali metal halide, the solvent is removed at reduced pressure; this removal may be facilitated by the addition of an inert solvent (for example benzene). Thus a residue consisting of the quaternary ammonium alcoholate is obtained, to which is added a lactam, in slight excess with respect to the stoichiometric quantity, dissolved in an inert solvent (for example ethyl ether or dioxan).

From the solution thus obtained the desired compound is precipitated in the form of a crystalline solid, usually by cooling and/or by the addition of a non-solvent for the compound.

The compound obtained is used as a catalyst for the polymerization of anhydrous formaldehyde, the reaction being carried out in an inert liquid diluent as the reaction medium. In particular, the catalyst may be dissolved or in suspension in the said medium depending on the liquid chosen and the nature of the groups $R_1$ to $R_4$. When the catalyst is used in suspension it should be in a suitable physical form and, more particularly, in a finely divided form. To this end, during the preparation of the catalyst, the precipitation conditions may be regulated so as to obtain solid particles of a desired size within the range 5 to 300 microns, preferably 10 to 100 microns. The desired grain size can also be obtained by grinding the precipitate under inert conditions.

The polymerization of the formaldehyde is carried out by feeding gaseous, anhydrous formaldehyde into an agitated medium containing a diluent which is liquid under the reaction conditions, which is a non-solvent for the polymer formed and which is inert (unreactive).

The amount of catalyst may vary from 1 to 1000 parts by weight (preferably 20–500) for every $10^6$ parts by weight of formaldehyde fed in.

The diluents may be chosen for example from ethers (for example diethyl ether), aliphatic hydrocarbons (for example pentane, hexane, heptane and octane), aromatic hydrocarbons (for example benzene and toluene) and chlorinated hydrocarbons. Preferred diluents are hydrocarbons having 3 to 10 carbon atoms per molecule. As has already been stated the diluents must be inert, that is, they must not interfere with the catalyst, nor with the polymer being formed.

The formaldehyde used should have a high purity and dryness in order to produce polyoxymethylenes with high molecular weights (greater than at least 10,000). A suitable degree of purity may, for example, be achieved by means of purification processes described in U.S. Pat. Nos. 3,118,747, 3,184,900 and 4,203,735. In particular the impurities which must be eliminated are chemical compounds which give rise to chain-transfer phenomena, and substances of a polar nature which normally react with Grignard compounds. The most common impurities are methanol, water and formic acid. These impurities act as chain transfer agents during the polymerization and hence influence the molecular structure of the polyoxymethylene.

Clearly it is none the less possible to influence the said molecular structure in the desired sense by carrying out the polymerization in the presence of small quantities of suitable chain regulators such as carboxylic acids and esters having at least two carbon atoms per molecule, aliphatic, cycloaliphatic and aromatic alcohols, carboxylic acid anhydrides, amides, imines and other polar compounds, such as, for example water. These substances display their desired activity within a range of concentrations which generally vary from 10 to 10,000 parts by weight for every $10^6$ by weight of formaldehyde fed in.

It is thus possible to produce polyoxymethylenes which, after suitable stabilisation, may be worked by injection moulding, extrusion, spinning and processes known as "roto-moulding" and "blow-moulding" to produce useful articles and moulded parts.

The polymerization temperature may vary within wide limits, in general from about $-100°$ C. up to the boiling point of the diluent used as the reaction medium, but, in any case, not higher than about 100° C. The preferred temperatures are from $-30°$ C. to 70° C.

The pressure is usually maintained at atmospheric value, even though it is possible to carry out the reaction at pressures greater than or less than atmospheric pressure.

The polymerization of the formaldehyde may be carried out discontinuously, semi-continuously or continuously. When operating continuously, the catalyst is conveniently introduced into the reaction medium as a suspension or solution in an inert organic carrier. A continuous method is, for example, described in U.S. Pat. No. 3,458,479.

In every case, at the end of the polymerization, a suspension of the polyoxymethylene is obtained from which the polymer is recovered in the form of granules with a size of about 20 to about 700 microns, and typically about 20 to about 100 microns when the reaction is carried out with the catalyst in solution and from about 60 to about 700 microns when the reaction is carried out with the catalyst in suspension. In the latter case the grain size of the polymer depends on that of the catalyst.

The apparent density of the polyoxymethylene, once separated from the reaction medium and dried, again depends on the way in which the catalyst is used.

More particularly, the apparent density is of the order of 0.15 to 0.25 g/ml when the catalyst is in solution and of the order of 0.5 to 0.7 g/ml when the catalyst is in suspension.

As is known, the formaldehyde polymer resulting from the polymerization contains at least one terminal hydroxyl group per macromolecule, which renders the polymer itself thermally unstable. In order to avoid depolymerization occurring at the end of the chain, the hydroxyl groups are conveniently converted into ester or ether groups, for example, by treatment with acetic anhydride or with methyl or ethyl orthoformate respectively, or into urethane groups by treatment with isocyanates. Methods known in the art may be used for these treatments, for example that described in U.S. Pat. No. 3,875,117.

The polyoxymethylene thus treated may be admixed with antioxidants (substituted phenols or bisphenols), as well as other substances of a weakly basic nature, which are able to block the formaldehyde and its oxidation products, such as formic acid. Examples of suitable basic substances are polymers such as polyamides and polyester-amides. Typical stabilization methods are given in U.S. Pat. Nos. 2,993,025 and 2,966,476.

The experimental examples which follow are given by way of illustration and are non-limiting. In these examples the parts and percentages are to be understood to be by weight unless otherwise indicated.

EXAMPLE 1

In a rigorously inert atmosphere, 46 parts of sodium are dissolved in 800 parts of anhydrous ethanol under agitation; to the solution are added 219.2 parts of tetramethylammonium chloride in 800 parts of ethanol and 1400 parts of anhydrous ethyl ether.

After filtration of the sodium chloride, the solvents are removed under vacuum so as not to exceed a temperature of 30° C. To the syrupy residue, which consists of tetramethylammonium ethylate, are added 168 parts of α-pyrrolidone in 1400 parts of anhydrous ethyl ether and, subsequently, 5000 parts of ethyl ether.

From the solution are separated 220 parts of a white and fine powder, which consists of tetramethylammonium pyrrolidonate.

| Conversion: | 69.5% |
|---|---|
| Melting point: | 150–151° C. |
| Grain sizes: | >125 micron = 2.5% |
| | 125–44 micron = 75.2% |
| | <44 micron = 22.3% |

The catalyst thus prepared may be stored at ambient temperature in an inert atmosphere.

Pure gaseous formaldehyde is introduced at a rate of 2.5 parts per minute into a polymerization reactor containing 1000 parts of anhydrous heptane and 0.05 parts of the catalyst prepared above. The reactor is furnished with a vigorous agitator and a system adapted to ensure strictly anhydrous conditions and is provided with a temperature-regulating jacket. The monomer is fed in for 300 minutes, the reaction temperature being maintained at 25° C.

The suspension of polymer formed is filtered and the polymer is dried in a vacuum oven at 50° C., 735 parts of product being recovered with a yield of 98.0% with respect to the formaldehyde.

The polymer, in powder form, has the following characteristics:

| Inherent visocisity = | 4.21 dl/g (measured at 60° C. at a concentration of 0.5 g/dl in solution in p-chlorophenol with 2% of α-pinene.) |
|---|---|
| Apparent density = | 0.70 g/ml |
| Grain sizes: | >350 micron = 8.2% |
| | 350–250 micron = 57.3% |
| | 250–125 micron = 32.2% |
| | <125 micron = 2.3% |

1 part of polymer is esterified under strictly inert conditions with a reactive system consisting of 1.5 parts of pure acetic anhydride in 3.0 parts of a mixture of $C_{12}$—$C_{13}$—$C_{14}$ normal paraffins (in a 25:25:50 ratio) at a temperature of 153°–155° C. for a time of 60 minutes.

Upon completion of the reaction, the suspension is filtered and the reagent is recovered by washing with toluene. After drying in a vacuum oven at 70° C., the polymer recovered (96.8%) is again analysed.

Inherent viscosity: 4.20 dl/g.

Apparent density and grain size; no appreciable variation with respect to the initial polymer.

Nitrogen content: ≦2 ppm (analytical limit).

Thermal degradation test: $K_{220}$-thermal degradation at 220° C. in a nitrogen atmosphere: rate of decomposition of the polymer given as a percentage by weight per minute during the first 30 minutes.

The determination is carried out by means of a thermo-balance with continuous purging of the degradation products with a gas flow, $K_{220}=0.07$.

EXAMPLE 2

Tetramethylammonium caprolactamate is prepared in a manner similar to that given in the first part of Example 1.

Melting point: 123° C.
Grain sizes:

| >125 micron = | 0.5% |
|---|---|
| 125–44 micron = | 43.2% |
| <44 micron = | 56.3% |

The product, in powder form, is preserved at ambient temperature in an inert atmosphere.

The formaldehyde polymerisation is carried out as described in Example 1 by introducing the monomer, at a rate of 2.5 parts per minute, into an agitated reactor containing 1000 parts of tetramethylammonium coprolactamate. 0.45 parts of n-propanol are also introduced into the reactor. The monomer is fed in for 200 minutes, the polymerization temperature being maintained at 20° to 25° C.

After filtration of the suspension, the polymer is dried in a vacuum oven at 50° C., 485.5 parts of the product thus being recovered with a yield of 97.1% with respect to the formaldehyde introduced. The following tests are carried out on the polymer:

Inherent viscosity: 1.40 dl/g.
Apparent density: 0.61 g/ml.
Grain sizes:

| >350 micron = | 6.5% |
|---|---|
| 350–250 micron = | 35.2% |
| 250–125 micron = | 41.0% |
| <125 micron = | 17.3% |

One part of the polymer is esterified with acetic anhydride under the conditions shown in Example 1.

At the end of the reaction, 95.5% of stabilised polyoxymethylene is recovered having an identical inherent viscosity to that of the crude polymer. The properties of the powder—apparent density and grain size—are also substantially unchanged.

Nitrogen content: $\leq 2$ ppm (analytical limit).
Thermal degradation test $-K_{220}=0.05$.

The polymer is fractionated in a column filled with Celite by using dimethylacetamide stabilised with 1% of diphenylamine as the solvent and operating with a programmed temperature. From analysis of the individual fractions it is found that the polymer has a molecular weight dispersion ratio, Mw/Mn, of 2.08. The values of Mw were determined by the light diffusion method described in J. Pol. Sci. A-2, 4 437 (1966), while the values of Mn were determined by the osmotic pressure method described in J. Pol. Appl. Polymer Science 1 164 (1959).

The polyoxymethylene, in powder form, is admixed with 0.5 of a block polyester-amide consisting of 92% of ε-caprolactam units and 8% of ε-caprolactone units and with 0.3% of pentaerythritol-tetra-β-(4-hydroxy-3,5-ditert butyl phenyl) propionate and the mixture is melted in a single-screw extruder at a temperature of 180° to 200° C. and converted into granules.

The following tests are carried out on the granules:
Melt Index at 195° C. with a load of 2160 g.
Thermal degradation at 220° C. in nitrogen: $K_{220}$.
Thermal degradation at 200° C. in air $-D_{220}$: percentage loss in weight of the polymer after 10 and 20 minutes. The measurement is carried out by means of a thermobalance with continuous removal of the gaseous decomposition products. The results are given in Table 1 (POM 2).

Furthermore the polymer is subjected to a specific thermal treatment at 230° C. (test CR) using apparatus for determining the melt-index. The granules are loaded into the apparatus and the melt-index is determined at various time intervals with a load of 2160 g.

Thus it is possible to follow the variation in fluidity (and hence in molecular weight) with time and the colour of the extruded product.

The results (POM 2) are recorded in Table 2.

EXAMPLE 3

Diethyl-dioctadecylammonium caprolactamate for use as the polymerization catalyst is prepared in an identical manner to Example 1, using diethyl-dioctadecylammonium chloride as the starting halide.

The pure gaseous formaldehyde is introduced into the polymerization reactor, containing 1000 parts of anhydrous toluene and 0.46 parts of the catalyst at a rate of 2.5 parts/minute and for a time of 50 minutes. 0.09 parts of n-butanol are also introduced into the reactor which is maintained at 10° C.

After filtration of the suspension, the polymer is dried in a vacuum oven at 50° C., 122.7 parts of product thus being recovered with a yield of 98.2% with respect to the monomer introduced.

The polymer has the following characteristics:
Inherent viscosity: 1.82 dl/g.
Apparent density: 0.20 g/ml.
Grain sizes:

| | |
|---|---|
| >88 micron = | 10.2% |
| 88–44 micron = | 70.8% |
| <44 micron = | 19.0% |

One portion of polymer is stabilised by esterification with acetic anhydride under the conditions shown in Example 1, with a yield of 96.8%.

Nitrogen content of the polymer: $\leq 2$ ppm (analytical limit).

The polymer is admixed with stabilising agents and converted into granules in a manner identical to that indicated in Example 2. The results of the tests carried out on the granules (POM-3) are recorded in Tables 1 and 2.

TABLE 1

| | Melt Index (g/10 min) | $K_{220}$ (%/min) | $D_{220}$ (%) 10' | $D_{220}$ (%) 20' |
|---|---|---|---|---|
| POM 2 | 10.2 | 0.04 | 0.6 | 1.2 |
| POM 3 | 1.9 | 0.04 | 0.6 | 0.9 |

TABLE 2

| POM-2 | | | POM-3 | | |
|---|---|---|---|---|---|
| Stay time (min) | Melt Index g/10' | Colour | Stay time (min) | Melt-Index g/10' | Colour |
| 5 | 15.4 | White | 5 | 3.4 | White |
| 10 | 15.2 | " | 10 | 3.2 | " |
| 15 | 16.0 | " | 15 | 3.4 | " |
| 20 | 16.3 | " | 20 | 3.5 | " |
| 25 | 17.1 | " | 25 | 3.6 | " |
| 30 | 18.3 | " | 30 | 4.0 | " |

EXAMPLE 4

46 parts of metallic sodium are reacted with 800 parts of anhydrous ethanol in identical conditions to those of Example 1 to obtain an alcoholic solution of sodium ethylate. 644 parts of tetrabutylammonium bromide are then dissolved in 800 parts of ethanol and the reaction is carried out as described in Example 1, thus obtaining 352 parts of tetrabutylammonium piperidonate in the form of a white, crystalline powder.

Melting point: 161° C.
Grain sizes:

| | |
|---|---|
| >88 micron = | 0.9% |
| 88–44 micron = | 26.9% |
| <44 micron = | 72.2% |

The product is preserved in a rigorously inert atmosphere.

Pure gaseous formaldehyde is introduced into the polymerization reactor, containing 1000 parts of anhydrous hexane and 0.110 parts of the piperidonate, at a rate of 2.5 parts/minute for a time of 108 minutes. The polymerisation temperature is maintained at 35° to 40° C.

At the end of the reaction the suspension is filtered and the polymer is dried under vacuum at 50° C.; 263.2 parts of polyoxymethylene being recovered with a yield of 97.5% with respect to the monomer introduced.

The powdered polymer has the following characteristics:
Inherent viscosity: 2.25 dl/g.
Apparent density: 0.68 g/ml.
Grain sizes:

| | |
|---|---|
| >350 micron = | 2.4% |
| 350–250 micron = | 20.7% |
| 250–125 micron = | 33.9% |
| <125 micron = | 43.0% |

One part of the polymer is stabilised by etherification with a reactive system consisting of 0.4 parts of triethylorthoformate, 0.8 parts of dimethylformamide, 2 parts of heptane and 0.05 parts of diethyl sulphate. The reaction mixture is maintained at a temperature of 150° to 152° C. for 30 minutes. After filtration, the polymer is washed with heptane and then with methanol, thus recovering, after drying, 97.2% of the polymer.

The polymer, which has not undergone any appreciable variation in grain size and apparent density, is subjected to the following tests:

Inherent viscosity: 1.78 dl/g.
Nitrogen content: ≦2 ppm (analytical limit).
Stability to alkaline attack.

A portion of the polymer is dissolved in dimethylacetamide containing 1% of triethanolamine at a temperature of 150° to 152° C. for a time of 30 minutes, using a polymer/dimethylacetamide ratio of 1/10. At the end of the reaction the polymer is precipitated by cooling and after filtration is washed with methanol and dried.

The percentage of remaining polymer is given as the alkali-stable fraction ASF (see Table 3 under POM-4).

Other physico-mechanical characteristics are determined after the addition of 0.8% of polyvinyl pyrrolidone with a molecular weight of 30,000 and 0.4 of 2,2'-methylene-bis (4-methyl-6-tert-butylphenol) and conversion to granular form by means of an extruder. The data (POM 4) are recorded in Tables 3 and 4. The polymer is fractionated in a manner similar to that explained in Example 2. Thus a molecular weight dispersion ratio of 1.79 is found.

EXAMPLE 5

In the formaldehyde polymerization reactor containing 1000 parts of toluene, 0.050 parts of tetrabutylammonium piperidonate (prepared as described in the first part of Example 4), pure gaseous formaldehyde is introduced at a rate of 2.5 parts/minute, over a period of 40 minutes, thus obtaining 98.5 parts of polyoxymethylene with a yield of 98.5% with respect to the monomer introduced.

The polymer, in powder form, has the following characteristics:

Apparent density: 0.15 g/ml.
Grain sizes:

| | |
|---|---|
| >88 micron = | 9.4 |
| 88–44 micron = | 74.2% |
| <44 micron = | 16.4% |

The polymer is stabilized by etherification under the conditions shown in Example 4, 95.2% of the product being recovered.

The polymer, which has not undergone any variations in its physical characteristics, is subjected to the following tests:

Inherent viscosity: 1.35 dl/g.
Stability to alkaline attack—ASF (see Table No. 3 under POM-5).
Determination of the heat-resistant properties and physical and mechanical characteristics after admixture with additives and conversion into granules in a manner similar to that described in Example 4 (see Tables 3 and 4 under POM-5).

TABLE 3

| | Melt Index (g/10') | ASF (%) | $K_{220}$ (%/min) | $D_{220}$ (%) 10' | $D_{220}$ (%) 20' |
|---|---|---|---|---|---|
| POM - 4 | 2.2 | 97.8 | 0.04 | 0.6 | 1.0 |
| POM - 5 | 15.0 | 98.1 | 0.04 | 0.5 | 0.9 |

TABLE 4

| | POM - 4 | POM - 5 |
|---|---|---|
| Tensile strength - kg/cm$^2$ - (ASTM D 638) | 718 | 700 |
| Elongation - % (ASTM D 638) | 75 | 30.0 |
| Impact strength Izod with notch (Kg.cm/cm$^2$) (ASTM D 256) | 16 | 11.5 |

EXAMPLE 6

A formaldehyde polymerization test is carried out over a long period using the reactor of Example 1 modified so as to allow the continuous feeding of heptane and tetramethylammonium pyrrolidonate and removal of the suspension of polymer formed.

Initially, pure gaseous formaldehyde is introduced into the reactor containing 1000 parts of heptane and 0.08 parts of tetramethylammonium pyrrolidonate at a rate of 2.5 parts per minute for a time of 100 minutes.

Subsequently the suspension is discharged continuously, while introducing heptane so as to maintain the reactor at a constant level.

During the continuous test, of 300 hour duration, 7.2 parts of catalyst and 27 parts of ethanol are introduced.

During the test 44,420 parts of polyoxymethylene are produced with a total yield of 96.5% with respect to the monomer introduced.

At the end of the reaction, both the static parts (walls, transfer tubes for the suspension, etc.) and the moving parts, such as the agitator, of the polymerization reactor are clean and free from encrustations.

The following determinations are carried out on the polymer:

Inherent viscosity: 1.28 dl/g.
Apparent density: 0.59 g/ml.
Grain sizes:

| | |
|---|---|
| >350 micron = | 3.9% |
| 350–250 micron = | 47.3% |
| 250–125 micron = | 42.2% |
| <125 micron = | 6.6% |

One part of polymer is stabilised by esterification with acetic anhydride under the conditions shown in Example 1.

At the end of the reaction, 95.0% of the polymer is recovered and is characterized as already described above:

Inherent viscosity: 1.29 dl/g.
Nitrogen content: ≦2 ppm.
Apparent density and grain size (no appreciable variations compared with the crude polymer are noted).

The polymer is fractionated as described in Example 1. A molecular weight dispersion ratio $\overline{M}w/\overline{M}n$ of 1.95 is found.

Determination of the heat-resistant properties and the physical and mechanical characteristics after addition of 0.5% of polyamide—6 and 0.4% of n-octadecyl-β-(3,5-di-ter-butyl-4-hydroxyphenyl) propionate and conversion into granular form. The results (POM-6) are recorded in Tables 5 and 6.

EXAMPLE 7

Tetrabutylammonium ω-lauryllactamate is prepared by operating under identical conditions to those of Example 1.

The product is used as the catalyst for the polymerization of formaldehyde in a continuous test similar to that described in Example 6. The test is carried out with benzene as the diluent and has a duration of 300 hours. 44,550 parts of polymer are produced with a yield of 99.0% with respect to the monomer introduced, by adding 9.0 parts of the lactamate.

The polymer is stabilized under the conditions shown in Example 4 with a yield of 95.0%.

The following determinations are carried out on the polymer:

Inherent viscosity: 1.59 dl/g.
Nitrogen content: ≦2 ppm.
Apparent density: 0.18 g/ml.
Grain sizes:

| | |
|---|---|
| >88 micron = | 11.7% |
| 88–44 micron = | 65.4% |
| <44 micron = | 22.9% |

Determination of the alkali-stable fraction-ASF (see Table 5 under POM-7).

The polymer is fractionated as described in Example 1. A molecular weight dispersion ratio $\overline{M}w/\overline{M}n$ of 1.89 is found.

Determination of the heat-resistant properties and the physical and mechanical characteristics after the addition of 0.5% of polyamide-6 and 0.4% of n-octadecyl-β (3-5-di-tert-butyl-4-hydroxyphenyl) propionate and conversion into granular form.

The results (POM-7) are recorded in Tables 5 and 6.

TABLE 5

| | Melt-Index (g/10 min) | ASF (%) | $K_{220}$ (%/min) | $D_{220}$ (%) 10' | 20' |
|---|---|---|---|---|---|
| POM - 6 | 15.2 | — | 0.04 | 0.6 | 1.2 |
| POM - 7 | 6.1 | 97.8 | 0.03 | 0.4 | 0.9 |

TABLE 6

| POM - 6 | | | POM - 7 | | |
|---|---|---|---|---|---|
| Stay time (min) | Melt-Index | Colour | Stay time (min) | Melt-Index | Colour |
| 5 | 23.8 | White | 5 | 10.8 | White |
| 10 | 23.8 | " | 10 | 10.6 | " |
| 15 | 24.3 | " | 15 | 10.8 | " |
| 20 | 25.2 | " | 20 | 11.0 | " |
| 25 | 26.2 | " | 25 | 11.4 | " |
| 30 | 27.8 | " | 30 | 11.9 | " |

We claim:

1. A process for preparing polyformaldehyde which comprises polymerizing anhydrous monomeric formaldehyde in an organic diluent which is liquid under the polymerization conditions, which is a non-solvent for polyformaldehyde and is inert (unreactive) towards the other constituents of the polymerization medium, in the presence of a catalytic amount of a compound of the general formula:

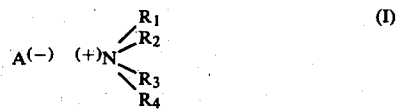

wherein R1, R2, R3 and R4 independently are an alkyl, cycloalkyl, aryl or alkylaryl radical, and wherein $A^{(-)}$ is a lactamate group of the general formula:

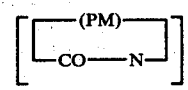

in which PM is a linear polymethylene chain with from 3 to 13 carbon atoms, non substituted or having one or more hydrogen atoms replaced by an alkyl, cycloalkyl, aryl or alkylaryl radical.

2. The process of claim 1, wherein the radical $A^{(-)}$ in formula (I) is selected from the group consisting of α-pyrrolidonate, α-piperidonate, ε-caprolactamate and ω-lauryllactamate.

3. The process of claim 1 or 2, wherein the radical (+)N(R1 R2 R3 R4) in formula (I) is selected from the group consisting of tetramethyl-, tetraethyl-, tetrapropyl-, tetrabutyl-, tetraheptyl-, phenyltrimethyl-, benzyltrimethyl- and cyclohexyltrimethylammonium.

4. The process of claim 1, wherein the compound of formula (I) is used in an amount of from 1 to 1000 parts by weight for every $10^6$ parts by weight of formaldehyde.

5. The process of claim 1, wherein the compound of formula (I) is used in an amount of from 20 to 500 parts by weight for every $10^6$ parts by weight of formaldehyde.

6. The process of claim 1, wherein the organic diluent is selected from the group consisting of ethers, aliphatic hydrocarbons, aromatic hydrocarbons and chlorinated hydrocarbons.

7. The process of claim 1, wherein the polymerization is carried out at a temperature of from −30° to 70° C.

* * * * *